April 7, 1925.
M. G. MASTIN
PRESERVING AND PACKING OF FOODS
Filed May 17, 1922
1,532,831
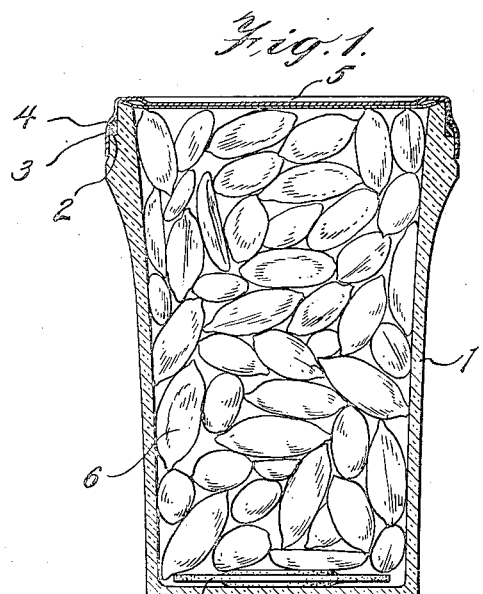
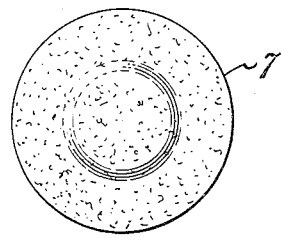
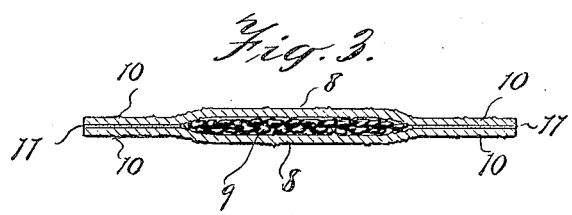
INVENTOR.
Marion G. Mastin
BY Gifford Bull
ATTORNEY.

Patented Apr. 7, 1925.

1,532,831

UNITED STATES PATENT OFFICE.

MARION G. MASTIN, OF CANAJOHARIE, NEW YORK.

PRESERVING AND PACKING OF FOODS.

Application filed May 17, 1922. Serial No. 561,606.

*To all whom it may concern:*

Be it known that I, MARION G. MASTIN, a citizen of the United States, and a resident of Canajoharie, in the county of Montgomery and State of New York, have invented certain new and useful Improvements in Preserving and Packing of Foods, of which the following is a specification.

My invention relates to new and useful improvements in the preservation and packaging of food substances, and more particularly to the preservation of food such as nuts, which, when packaged for the trade, are subject after a time to become rancid, giving rise to objectionable odor and taste.

The invention is particularly applicable, although I desire it understood that it is not to be so limited, to the preservation of nuts, such, for example, as peanuts, which after roasting are sorted and packaged in jars, glass receptacles, or other suitable containers for sale. It is well-known that no matter how carefully nuts may be treated in roasting, and no matter what oil or fat may be employed in such treatment, and even with the most careful packing, for example, in sealed vacuum jars, that within a short period as four or five days after packaging, a disagreeable odor and taste become noticeable and increase at such a rate that in about one month the nuts become unmarketable.

I believe that the objectionable odor and taste arise from rancidity, due to the action of oxygen of the air, or of moisture, or possibly both, upon the oily matter of the nuts (or possibly it is due to gaseous or vaporous matter given off by the nuts). I have discovered that the objectionable odor and taste, from whatever cause they may arise, are effectively removed or prevented by including in the container in which the nuts are packaged, a suitable absorptive material, preferably an adsorptive substance which will take up air and moisture, or gases, and prevent the same from having a deleterious effect on the nuts. By such provision the rate of increase of rancidity will be slowed down to such an extent that the nuts will remain marketable over a much longer period than has heretofore been possible. I particularly apply the invention to the packaging of nuts in glass jars or paper packages, and in such case preferably enclose the adsorptive substance in a suitable capsule or container so that it will be sufficiently exposed to moisture, gases, etc., but will not be permitted to directly contact the food product with which it is associated. The invention is not limited to any particular adsorptive substance, but may consist of high grade charcoal, such, for example, as vegetable charcoal derived from charring cocoanut shells, or it may consist of silica gel, or any other suitable adsorptive substance which will be unobjectionable in connection with food stuffs. I prefer, however, to employ charcoal particularly of the character above mentioned.

The invention consists in the improvements to be more fully described hereinafter, and the novelty of which will be particularly pointed out and distinctly claimed.

In the accompanying drawings, I have fully and clearly illustrated one embodiment of my invention, and in which Fig. 1 is a view in vertical central section through a suitable container such as a glass containing, for example, peanuts;

Fig. 2 is a plan view of a packet or capsule containing the adsorptive material, and Fig. 3 is a central transverse section through the packet or capsule shown in Fig. 2.

Referring to the drawings by characters of reference, 1 designates a container preferably in the form of a glass receptacle or tumbler, such as is commercially used in the trade for the packaging of various food products. The container is provided at its upper end with a shoulder 2 receiving a packing or washer 3 with which cooperates a flange 4 on a cover or cap 5. The container just described is of a well-known type employed where it is desired to pack food products in a rarefied atmosphere or under vacuum, the cover or cap sealing the container against ingress of air or moisture to the contents of the receptacle. The receptacle is shown as containing a food product, such, for example, as roasted and salted peanuts, shown generally at 6.

In the receptacle is arranged a capsule 7 containing the adsorptive material which acts to absorb moisture, air and gases which may exist in the container. This capsule consists preferably of circular discs 8 preferably of a size approximating the bottom wall of the receptacle, said discs receiving between them the adsorptive material 9, for example, vegetable charcoal preferably in granular or powdered form, the outer or marginal edges 10 of the discs being sealed by any suitable adhesive 11, as clearly shown in Fig. 3 of the drawings, so as to effectively retain the adsorptive material in the capsule and prevent it from sifting out into contact with the food product contained in the receptacle 1. The discs 8 are preferably of highly porous paper, such for example, as blotting-paper, or paper similar thereto, which will permit ready access of the moisture and gases in the receptacle to the adsorptive material in the capsule, or, if desired, one side of the capsule may be made of a close-textured or closely woven cloth, such, for example, as muslin. The adhesive 11 preferably consists of a flour base, or any other adhesive which is odorless and which will not have a deleterious effect on the food contents of the receptacle. I have found that the charcoal may be anywhere from one-third of one per cent to one per cent by weight of the nuts contained in the container.

The charcoal is preferably treated by heating it to about 125° to 150° C. in a vacuum for a period of several hours before enclosing it in the capsule, this being desirable in order to increase its capabilities of adsorbing the gases in the container. I have shown the invention as being applicable to containers wherein the food product, for example, nuts, is packed under vacuum, but I desire it understood that the invention is not limited to such a package, but is equally applicable to a package consisting of a paper bag made from glassine paper, or any suitable box.

When the invention is applied to a package in which the goods are packed under vacuum, the capsule, together with the food product, is placed in the receptacle and the proper vacuum produced, by any suitable means, in the spaces about the food product, whereupon, the cover is applied and seals the container against ingress of air and moisture. However, I wish it understood that the invention is not limited to a vacuum package, or that the capsule shown is limited in its application to any particular package or food, but may be used in any kind of a package or in connection with any food wherever applicable.

In cases where the food product is packed under high vacuum, it will be seen that the addition of a small amount of adsorptive material will remove from around the food product considerable quantities of residual air and moisture vapors, thus considerably slowing down the rate of increase of rancidity. If a small amount of rancidity develops, the charcoal prevents it from becoming noticeable or objectionable by absorbing the vapors (caused by rancidity) arising from the nuts and effectually removing such vapors from the container by the peculiar phenomenon generally designated as adsorption.

What I claim and desire to secure by Letters Patent of the United States is:—

1. A method of preserving nuts, which consists in enclosing the same in a suitable receptacle together with an adsorptive material.

2. A method of preserving nuts, which consists in enclosing the same in a suitable receptacle together with a vegetable charcoal.

In testimony whereof I have hereunto signed my name in the presence of two subscribing witnesses.

MARION G. MASTIN.

Witnesses:
C. E. SMITH,
ALLIE D. SHUBERT.